United States Patent [19]
Moorhead et al.

[11] Patent Number: 5,476,622
[45] Date of Patent: Dec. 19, 1995

[54] METHOD AND APPARATUS FOR MAKING ARTICLES FROM PARTICLE BASED MATERIALS

[75] Inventors: Arthur J. Moorhead, Knoxville; Paul A. Menchhofer, Oak Ridge, both of Tenn.

[73] Assignee: Martin Marietta Energy Systems, Inc., Oak Ridge, Tenn.

[21] Appl. No.: 898,914

[22] Filed: Jun. 12, 1992

[51] Int. Cl.⁶ .................................................. C04B 35/64
[52] U.S. Cl. ............................ 264/63; 264/109; 425/144; 425/378.1
[58] Field of Search .......................... 264/63, 109, 125, 264/126, 127; 425/143, 144, 378.1

[56] References Cited

U.S. PATENT DOCUMENTS

| | | | |
|---|---|---|---|
| 3,423,358 | 1/1969 | Burke, Jr. | 260/41 |
| 3,950,118 | 4/1976 | Adair | 425/144 |
| 4,132,564 | 1/1979 | Burke, Jr. et al. | 106/308 |
| 4,197,070 | 4/1980 | Koschmann | 425/135 |
| 4,894,194 | 1/1990 | Janney | 264/109 |
| 4,906,424 | 3/1990 | Hughes et al. | 264/63 |
| 4,913,863 | 4/1990 | Burrafato et al. | 264/40.6 |
| 5,028,362 | 7/1991 | Janney et al. | 264/25 |

OTHER PUBLICATIONS

Publication entitled "Gelcasting of Alumina". *J. Am. Cer,* vol. 74, No. 3, Mar. 1991.

IBM Technical Disclosure Bulletin vol. 14, No. 10 (Mar. 1972) (1 page).

*Primary Examiner*—Allan R. Kuhns
*Attorney, Agent, or Firm*—Robert O. Fox; Mark S. Graham; Joseph A. Marasco

[57] ABSTRACT

A method and apparatus for the production of articles made of a particle-based material; e.g., ceramics and sintered metals. In accordance with the invention, a thermally settable slurry containing a relatively high concentration of the particles is conveyed through an elongate flow area having a desired cross-sectional configuration. The slurry is heated as it is advanced through the flow area causing the slurry to set or harden in a shape which conforms to the cross-sectional configuration of the flow area. The material discharges from the flow area as a self-supporting solid of near net final dimensions. The article may then be sintered to consolidate the particles and provide a high density product.

16 Claims, 6 Drawing Sheets

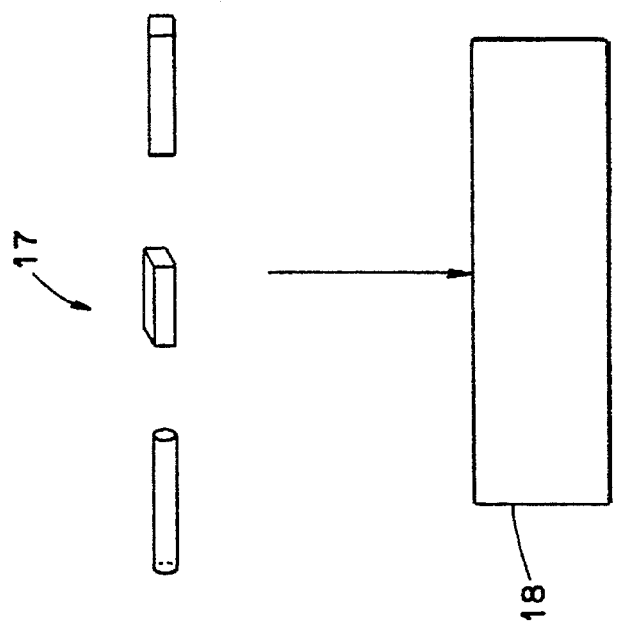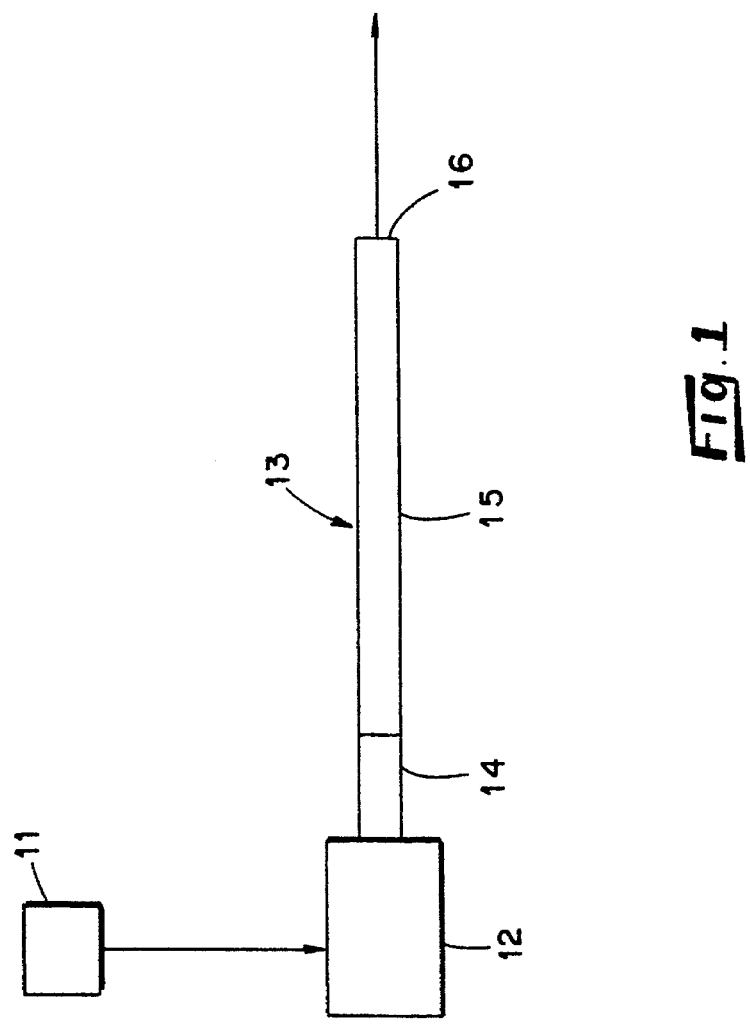
Fig.1

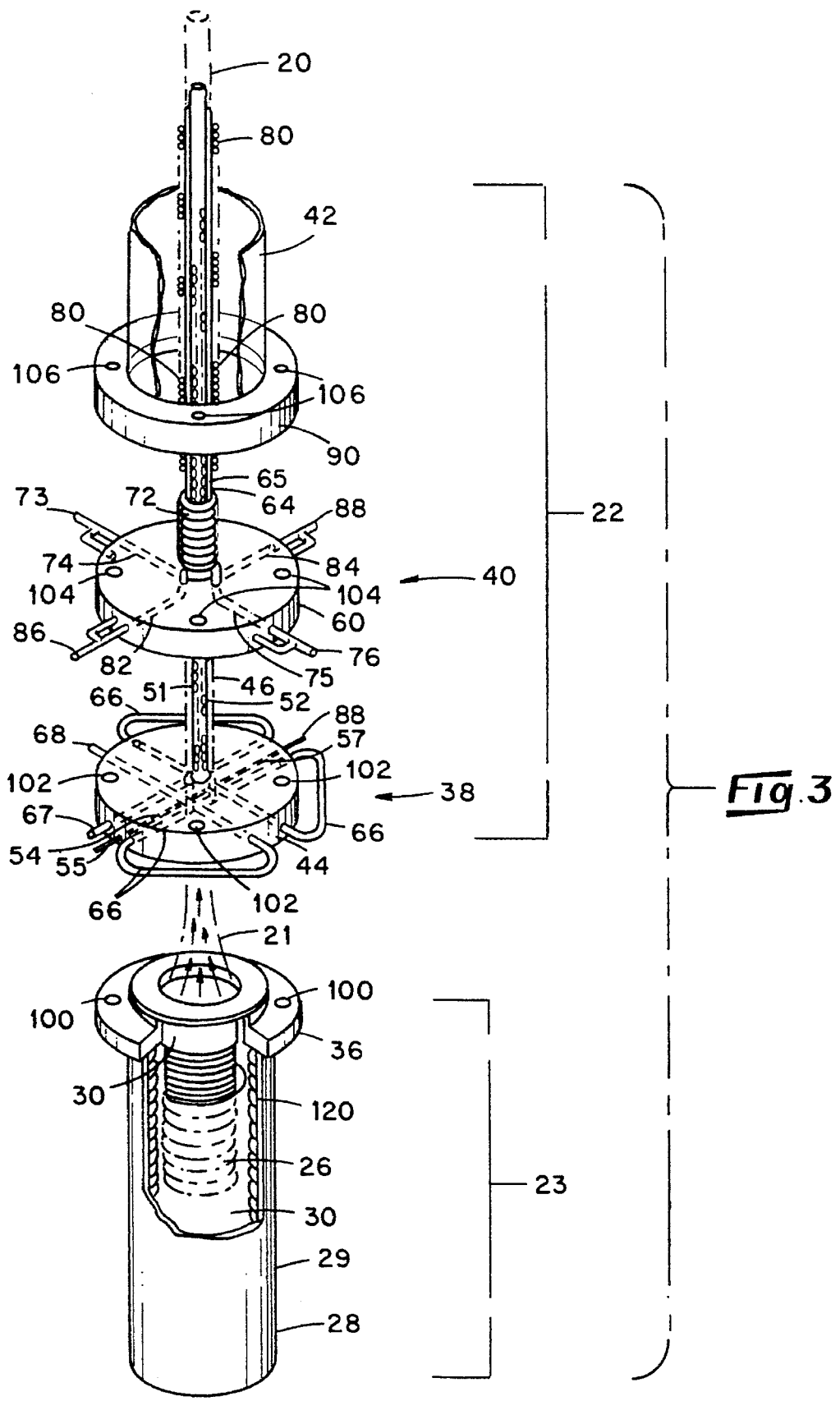

METHOD AND APPARATUS FOR MAKING ARTICLES FROM PARTICLE BASED MATERIALS

The United States Government has rights in this invention pursuant to blanket license agreement No. DE AC05-840R21400 awarded by United States Department of Energy Contract with Martin Marietta Energy Systems, Inc.

This invention relates generally to articles produced from powders and processes for producing articles from powders. More particularly, this invention relates to a method and apparatus for use in the production of articles made by sintering particles in a desired form.

Conventional methods for producing particle-based materials involve forming powders into various shapes and firing the bodies at a sufficiently high temperature (sintering) to cause the particles to consolidate into a high density solid. one such method comprises sintering the powder in a mold to form a blank of consolidated material and machining the blank into a component of the desired shape. This method is disadvantageous in that machining and shaping are very time consuming skill-intensive processes, and therefore relatively expensive. Furthermore, this method is not well-suited to the manufacture of certain objects such as long tubes for heat exchangers, or complex objects such as gears.

Accordingly it is an object of the present invention to provide a method and apparatus for use in the production of materials made from powders such as sintered ceramics and the like.

Another object of the present invention is to provide a method and apparatus for producing materials in the shape of long tubes or other elongate configurations in which the length is significantly greater than the cross-sectional dimension.

It is another object of the present invention to provide a method and apparatus for transforming an essentially liquid slurry having a relatively high solids content into a substantially solid, self supporting form while the slurry is in motion in a desired cross-sectional configuration.

A further object of the present invention is to provide a method and apparatus of the character described for producing articles of desired shapes which are substantially self-supporting in the green or as-molded state prior to any drying or heating.

A still further object of the present invention is to provide a method and apparatus of the character described wherein articles are continuously formed from a slurry to provide a self-supporting solid in the green state.

An additional object of the present invention is to provide a method and apparatus of the character described wherein the articles are continuously cast from a slurry without the need for a mold duplicating the length of the article.

Another object of the present invention is to provide a method and apparatus of the character described which enables production of articles of near net final shape and dimension.

Still another object of the present invention is to provide a method and apparatus of the character described which enables production of articles having a relatively complex geometry and articles which heretofore have been difficult to make with known production techniques.

An additional object of the present invention is to provide a method and apparatus of the character described which is cost effective and efficient in operation.

A further object of the present invention is to provide a method and apparatus of the character described which produces molded articles having improved properties and characteristics.

Having regard to the foregoing objects, the present invention is directed to a process and related apparatus for the production of articles made of a particle-based material. According to the invention, a thermally settable slurry containing a relatively high concentration of the particles is conveyed through an elongate flow area having a desired cross-sectional configuration. The temperature of the slurry is increased as it advances through the flow area to cause the slurry to set, into a relatively hard mass having a cross-sectional configuration conforming to that of the flow area. The hardened mass discharges from the flow area as a substantially self-supporting solid which retains the desired cross-sectional configuration substantially without external support. After a desired length of the material is obtained, it may be shaped if desired and then dried and sintered to provide a high density article.

The invention is particularly well-suited for the production of ceramic articles which lend themselves to manufacture by continuous forming such as tubes, rods, beams and other elongate shapes having a relatively uniform cross-section along at least appreciable portions of their length. A particularly advantageous embodiment of the invention is in the production of ceramic articles formed through consolidation of ceramic particles or powders wherein the particles are incorporated into a thermally settable slurry in a relatively high concentration such that the resulting green product readily achieves a high density solid article of the desired shape when sintered. Manufacture of such articles in accordance with the invention is advantageous over previous methods in that there is no need for long molds and mandrels. Also, the process of the invention provides an enhanced ability to control the properties and shape of the end products to improve the uniformity and lower the unit cost of the articles.

BRIEF DESCRIPTION OF THE DRAWINGS

The above and other features and advantages of the present invention will become further known from the following detailed description when considered in conjunction with the accompanying drawings in which:

FIG. 1 is a block diagram illustrating steps in a process for the production of elongate particle-based articles in accordance with one embodiment of the present invention;

FIG. 3 is an exploded view of portions of the apparatus of FIG. 2;

DETAILED DESCRIPTION OF THE INVENTION

Figure 2:
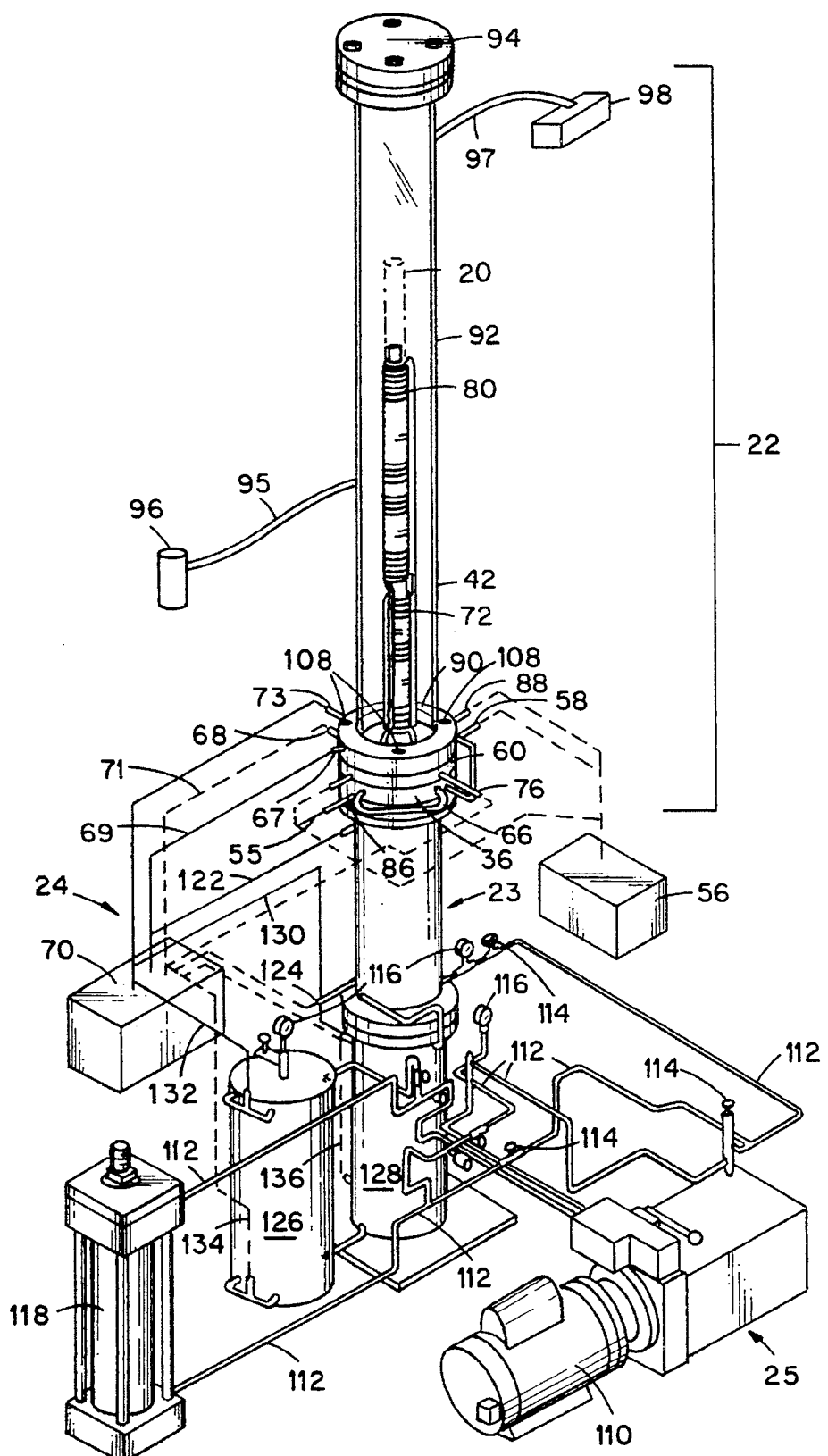
FIG. 2 is a perspective view of an apparatus for the production of elongate particle-based articles in accordance with one embodiment of the present invention.

With initial reference to FIG. 1, there is shown a block diagram illustrating steps in a process according to the invention for use in the production of solid articles made by sintering particles in a desired form. As used herein, the term "sintering" is understood to refer broadly to a process of consolidation or integration of essentially discrete particles to produce a solid. Various such processes are known to those of ordinary skill in the art and they typically involve the application of heat, pressure and/or other effects sufficient to cause consolidation of adjacent particles essentially without melting. The material comprising such articles is sometimes referred to herein as "particle-based" material. In the practice of the invention, the starting material for producing the articles is a relatively low viscosity slurry including a relatively high concentration of powders or particles such as a ceramic powder, a dispersant for the powder, and a solvent containing one or more monomers (binders) which crosslink under the influence of an initiator and the application of heat to form a polymer gel matrix which binds the powder particles together into a solid green body. It is noted that the invention will be described in the context of a preferred embodiment involving the production of ceramic articles from a slurry containing a ceramic powder or particles. However, it is believed that the invention finds application generally to the production of articles produced from particles and powders of various sorts such as, for example, glass powder used to make fritted glass and metal powders used to make sintered metal articles.

The slurry is prepared in a mixing tank indicated at 11 and is then introduced, such as by pumping or pouring, into a suitable reservoir or holding tank 12 where the slurry is maintained at a temperature sufficiently low to inhibit polymerization and cross-linking reactions.

The slurry is conveyed from the reservoir 12 through an elongate temperature controlled die 13 which defines an elongate flow area having a predetermined cross-sectional configuration conforming substantially to that of the article to be produced, so as to confine the moving material along a shaped flow path corresponding to the configuration of the flow area. Thus, for the production of a tubular-shaped article, the flow area defined by the die may have an annular or doughnut-shaped cross-sectional configuration with dimensions substantially equal to the cross-sectional dimensions and, thus, the "cross-sectional configuration" as the term is used herein of the tube to be produced. Those of ordinary skill in the art will recognize that the variety of cross-sectional configurations is virtually endless, limited only by the ability to construct a die defining the desired cross-sectional configuration. The flow area includes an entrance end section indicated at 14, which is cooled to inhibit the polymerization and cross-linking reactions.

Preferably, the slurry is conducted through the flow area under steady state plug flow conditions to minimize mixing and shear conditions as the slurry passes through the die. The slurry temperature is gradually increased as it progresses through a heated section of the flow area, indicated at 15, to a temperature which is sufficient to cause the monomer solution to set (through polymerization and cross-linking) and bind the particles into an essentially solid self-supporting form having the desired cross-sectional configuration. The essentially solid self-supporting form continuously discharges from an exit opening of the flow area, indicated at 16, to provide a ceramic article having the desired cross-sectional configuration as shown at 17. Thus, for a given powder, the achievement of solidification is a function of the composition and concentration of the monomer solution and initiator, the temperature, the residence time and the dimensions or configuration of the flow area.

The product is in a saturated, green condition as it discharges from the flow area in that it still contains most if not all of the liquid from its former low viscosity slurry form. The use of a slurry which contains a high powder content is preferred in the invention (e.g., 50–60 volume %). By employing such a high powder content, the powder particles are closely packed such that the discharging product is of near net final shape and dimensions, and any shrinkage or warpage experienced during drying is minimized. In addition, the closely packed particles are bound by the cross-linked and polymerized monomers such that the discharged article is quite strong and is an essentially self-supporting solid. This enables the product to substantially retain the desired configuration without external support and to substantially retain the desired cross-sectional configuration after subsequent heating and/or sintering steps to remove the solvent and polymerized monomers and to further consolidate or sinter the particles, as at 18.

In accordance with the invention, pressure is applied to the slurry to convey the slurry through the flow area at a predetermined rate. The rate of travel of the slurry provides a residence time within the flow area which is sufficient to permit the monomer(s) in the slurry to polymerize and cross-link so that the product is discharged from the flow area in a substantially self-supporting, solid form. The required pressure depends on many factors including, but not limited to, the viscosity profile of the slurry as it solidifies, the length of the flow area, the axial and radial temperature profile of the material and the coefficient of friction between the material and the surface of the die, and will generally be established for a given system by trial and error to attain the maximum reasonable rate of discharge for the cross-sectional configuration of interest.

It is noted that because the slurry has a relatively low viscosity and the body is solid only over a relatively short distance in the flow area, the overall resistance to flow is relatively low so that only minimal pressures are required to urge the cast body from the die. For example, the viscosity of a typical ceramic powder solution at a typical die entrance temperature in the range of from about 0° C. to about 2° C. may range from about 2 to about 6 poise. Under these conditions, an applied pressure of only about 20 psi may be required to cast a 1-inch-outside diameter by ½-inch inside diameter alumina tube discharging from the die 13 at a rate of about 2 linear inches per minute.

The pressure required to bring about the desired flow rate for continuous casting may be supplied by any suitable means including a positive displacement pump, or the head pressure of the slurry itself if the slurry reservoir is of sufficient depth and elevated above the die area. For batch operation, the slurry may be contained in a collapsible bladder or similar device in flow communication with the flow area, and the pressure applied to the outside surface of the bladder, such as by hydraulic fluid, to urge the slurry into and through the flow area.

As mentioned, the green product may be heated after discharge from the die 13 to substantially remove the water or other solvent and provide a dried product. Although the specific temperature and time necessary for drying the product depends on the composition of the slurry and other factors, adequate drying generally may be achieved by slowly heating the body in a controlled humidity environment from room temperature to about 120° C.,; e.g. The polymerized monomer(s) may be substantially removed from the product by further heating at higher temperatures, for example, from about 300° C. to about 600° C., over a suitable period of time to effect removal.

Finally, the product may be sintered to consolidate the particles and form a high density body. The various sintering temperatures and conditions for ceramic powders are well known in the art. Substantial removal of polymer components may be accomplished as a low-temperature step during the sintering process. That is, the processes of drying, monomer removal and sintering may be sequential stages of a continuous heating process wherein the final state of the product is achieved.

Ceramic powders suitable for use in the present invention include, but are not limited to, alumina, fused silica, magnesia, zirconia, spinels, mullite, tungsten carbide, silicon carbide, boron nitride, silicon nitride and mixtures thereof.

In a preferred embodiment, the powder is mixed with a dispersant compatible with the powder and a monomer solution to form a thermally settable slurry mixture having a relatively high concentration of powder particles, as described in U.S. Pat. Nos. 5,028,362 and 4,894,194 to Janney, the disclosures of which are incorporated herein by reference. The monomer solution provides a low viscosity vehicle for the ceramic powder in a high solids concentration. Additionally, when heated, the monomer solution polymerizes and crosslinks to provide a firm, strong polymer-solvent gel matrix with the powder dispersed therein. The gel matrix immobilizes the powder in the desired shape conforming to the cross-sectional configuration of the flow area through which the slurry mixture is conveyed. The resultant "green" product exhibits exceptionally high strength and good particle homogeneity.

Various dispersants for powders are known in the art and are appropriate for use in the present invention. Care should be exercised, however, in order to select a dispersant which does not interact in an undesirable manner with the components of the monomer solution, particularly the initiator or the solvent. A particular dispersant may be evaluated for suitability with a particular powder and a particular monomer solution by mixing small amounts of the respective components and judging the flow properties of the resultant mixture, whether the resultant mixture exhibits a notable and repeatable yield point, and/or whether the mixture is dilatant. Preferred dispersants for ceramic powders in water include acrylic and methacrylic acid salts. Preferred dispersants for ceramic powders in an organic solvent include ethoxylated alkylphenol dispersants. Generally, the dispersant is used in a small amount, by volume, as compared with the amount of the powder included in the mixture; e.g., from about 0.02 to about 0.04 volume percent for $Al_2O_3$ powders.

The monomer solution which is mixed with the ceramic powder and the dispersant to form the slurry preferably includes at least one monofunctional monomer, at least one difunctional monomer, a free-radical initiator compound and a solvent. Generally, the monofunctional monomer includes one functional group such as a vinyl or allyl group and the difunctional monomer includes two such groups.

Generally, the amount of monomer included in the monomer solution determines the degree of hardness of the resulting product. In general, green ceramic products of suitable rigidity may be formed using no more than about 20 volume percent monomers in the solution, and in a preferred embodiment, the solution comprises from about 5 to about 20 volume percent monomer. The monomer solution may comprise from about 35 to about 60 volume percent of the slurry.

The use of an aqueous solvent is preferred in the process of the present invention when casting ceramic articles. However, in some cases such as when the powder reacts with water specific monomers and initiators are chosen which are compatible with an organic solvent. The organic solvent substituted for the water in this process may comprise any organic solvent that will dissolve the multi-functional monomers and which exhibits a low vapor pressure and low viscosity at the temperature at which the multi-functional monomer polymerizes and crosslinks.

The monomer solution may further comprise a free-radical initiator compound for initiating the polymerization and cross-linking of the monomer when the slurry mixture is heated. Various thermally activated free-radical initiator compounds are known in the polymer art and are suitable for use in the method of the present invention. Preferred free radical initiator compounds for use with ceramic powders include ammonium persulfate and potassium persulfate. The preferred free-radical initiator is generally inactive at the expected storage temperature so that the shelf-life of the monomer solution is relatively long. However, once the slurry mixture containing the monomer solution is heated to the desired setting temperature, the initiator compound aids in achieving a relatively high reaction rate whereby polymerization and crosslinking of the monomers is easily and quickly achieved. The amount of initiator included in the monomer solution is generally small as compared with the amount of monomer included in accordance with conventional polymerization methods. By controlling the initiator to monomer ratio, the temperature of the slurry, and the residence time through the die, a continuously cast body can be made to polymerize at temperatures ranging from about 0° to about 75° C. in order to develop optimum properties in the green body.

Turning to FIGS. 2 and 3, there are shown aspects of one embodiment of an apparatus in accordance with the invention for continuously casting a ceramic article in the form of an essentially self-supporting green solid 20 of a desired-cross-sectional configuration from a thermally settable ceramic slurry 21 using a temperature controlled die 22, a slurry displacement system 23, a temperature control system 24 and a hydraulic system 25. The apparatus of FIGS. 2 and 3 is specifically adapted for continuous casting of ceramic articles from a fixed amount of starting material or slurry contained within the apparatus. However, it is understood that other methods of supplying the starting material may be utilized, such as continuous or semi-continuous modes wherein the slurry is continuously supplied to the die 22 under pressure from a large holding vessel or tank or wherein components of the slurry are separately contained in vessels or tanks and mixed together immediately ahead of the die.

Referring to FIG. 3, the thermally settable ceramic slurry 21 having the aforedescribed characteristics is forcibly urged by the slurry displacement system 23 through the flow area defined by the die 22 where the slurry is transformed into the solid article 20. In a preferred embodiment, the slurry displacement system 23 includes a containment bag 26 for the slurry 21 and a refrigerated displacement vessel 28 which supports the bag and maintains the slurry at a sufficiently low temperature to inhibit the polymerization and cross-linking reactions and maintain the essentially liquid nature of the slurry. The vessel 28 also receives high pressure fluid which acts upon the outside of the bag 26 to displace the slurry from the bag into the die.

The displacement vessel 28 preferably comprises a stainless steel casing 29 defining a cup-shaped reservoir 30 surrounding the containment bag 26 and into which a cooling fluid, preferably chilled hydraulic oil, is introduced by the hydraulic system 25 to force the slurry 21 from the containment bag into and through the die. The containment bag 26 is preferably provided by a relatively thick, durable latex rubber bag suspended into the displacement vessel 28 and having a non-collapsible plastic collar (not shown) provided at the opening thereof. An annular-shaped flange 36 is provided at the top of the displacement vessel 28 for securement of the vessel to the die 22.

With continuing reference to FIG. 3, the die 22 in the illustrated embodiment provides an elongate flow area having a substantially constant annular-shaped cross sectional configuration so as to provide the discharging green solid 20 in the form of an elongate hollow tube of indefinite length. For this application, the die 22 includes a transfer flange/inner die assembly 38, an outer die assembly 40 and a protective enclosure 42.

Figure 5A:
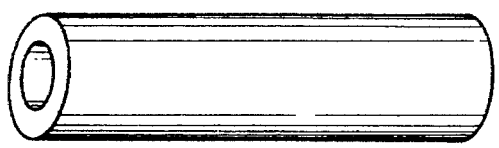
FIGS. 5a through 5e are perspective views of various articles which may be produced in accordance with the present invention.
Figure 5B:
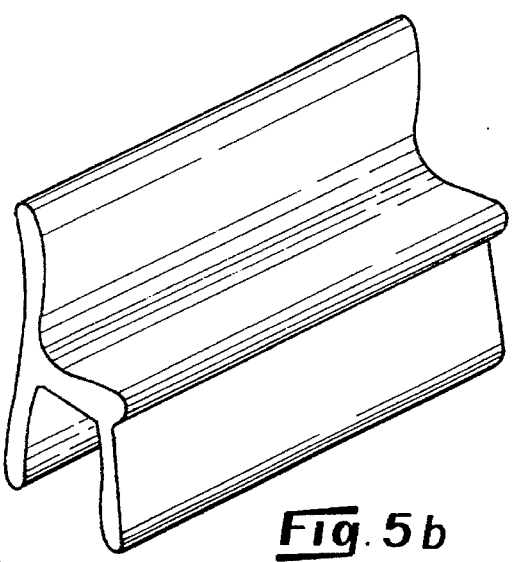
Figure 5C:
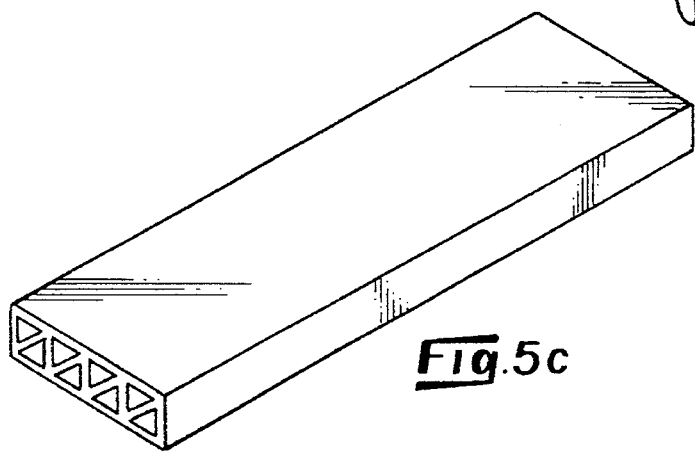
Figure 5D:
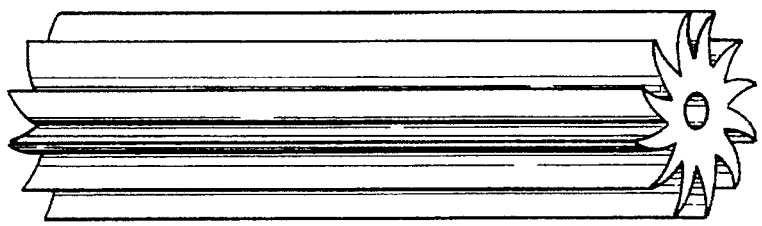
Figure 5E:
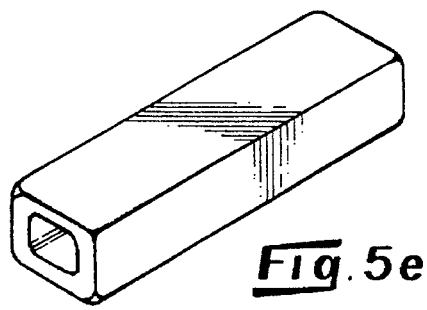

The transfer flange/inner die assembly 38 includes a solid stainless steel disc-shaped transfer flange 44 and an elongate upstanding mandrel 46 supported on the center of the flange 44. As will be described, the external cross-sectional configuration of the mandrel 46 defines the internal diameter and shape (the internal configuration) of the article 20; and therefore, in the case of the hollow tube shown in FIG. 5a, is preferably in the shape of an elongate tube with a substantially constant outer diameter.

The mandrel 46 is preferably provided with an outer surface having a relatively low coefficient of friction with respect to the slurry 21, particularly in its solidified form, so as to minimize any interaction with the slurry which may tend to impart shear forces to the slurry and cause undesired surface striations and the like on the finished article. Therefore, the outer surface of the mandrel 46 may be provided by a highly polished stainless steel or other material having a low coefficient of friction in relation to the slurry such as the polymeric product sold under the trademark TEFLON by the DuPont Corporation of Wilmington, Del., for example.

Figure 4A:
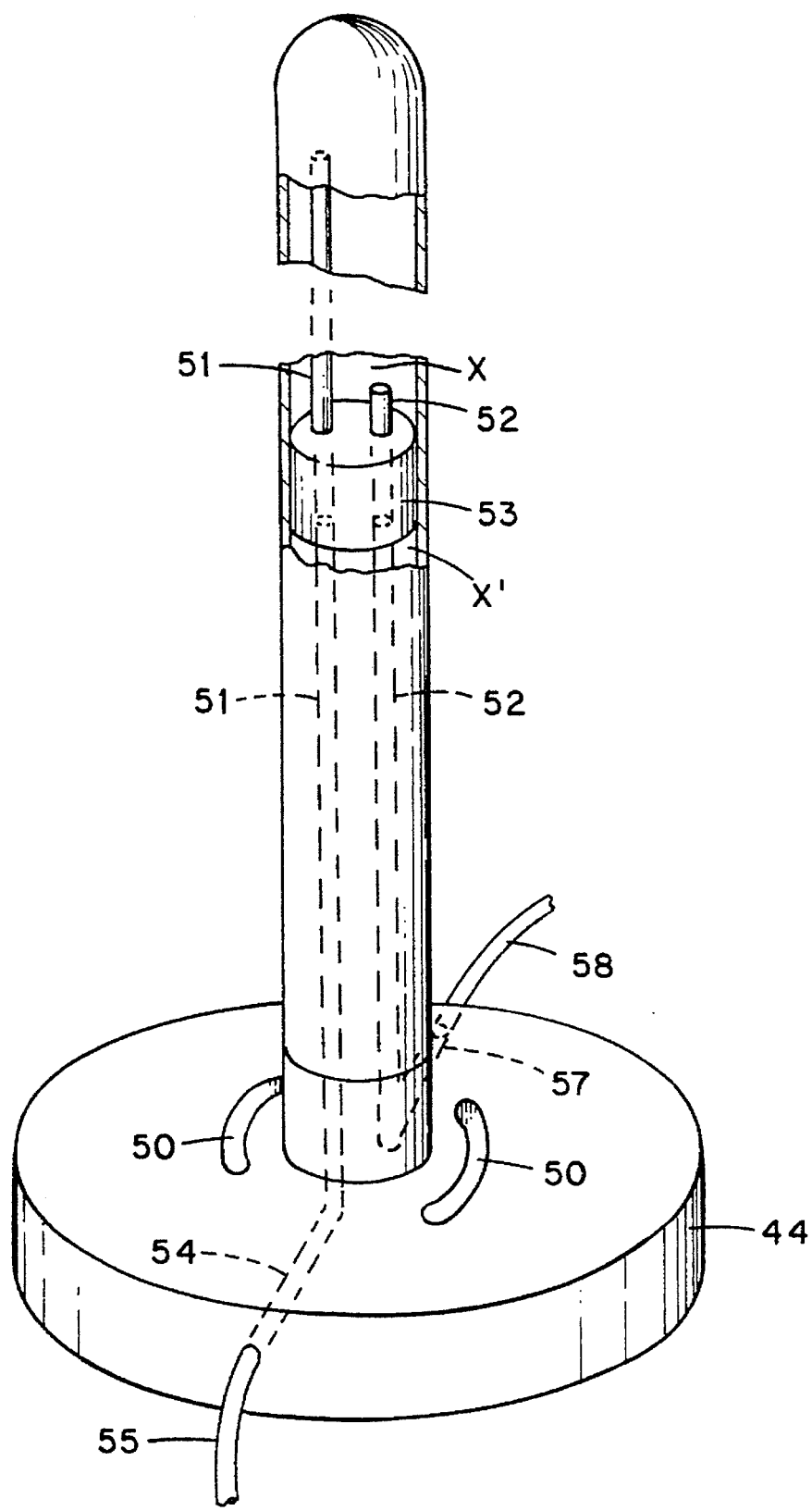
FIG. 4a is a perspective view of an inner die assembly used in a preferred embodiment of apparatus provided in accordance with the present invention and FIG. 4b is a cross-sectional view of the inner die assembly.
Figure 4B:
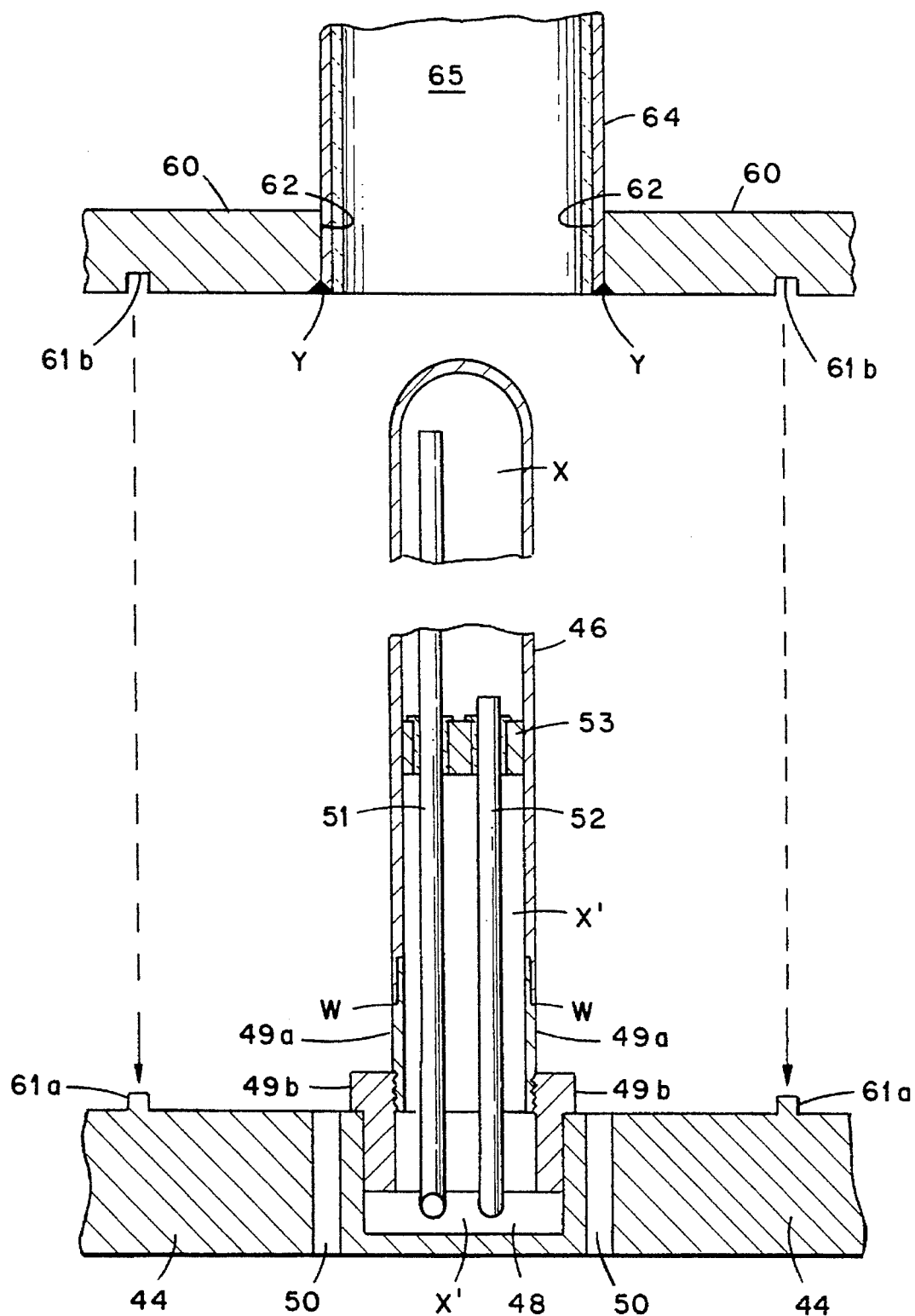

As best seen in FIGS. 4a and 4b, the lower end of the mandrel 46 is fittingly and engagingly received within a blind bore 48 located in the center of the flange 44 opening to its upper surface. The lower end of the mandrel includes a collar assembly made up of an inner bushing 49a welded to the inner surface of the mandrel 46 along a circumferential weld W, and an outer bushing 49b which threadably engages the lower end of the inner bushing 49a. The lower end of the mandrel 46 is assembled and installed by first welding the inner bushing in place, press fitting the outer bushing within the bore and threading the inner bushing 49a into the outer bushing 49b. The outer bushing 49b is preferably machined such that its outer diameter is about 0.0005 inch larger than the diameter of the bore 48. The outer bushing is press fitted in the bore by chilling the outer bushing in liquid nitrogen to shrink the outer bushing and then inserting the chilled bushing into the bore. The natural expansion of the outer bushing as it warms ensures a snug fit within the bore.

The transfer flange/inner die assembly 38 is further provided with kidney-shaped through openings 50 for transfer of the slurry from the bag 26 through the thickness of the flange 44 into the flow area of the die 22. As shown in FIG. 4b, the openings 50 are positioned to deliver the slurry 20 to positions closely adjacent the outer surface of the mandrel 46 and are just outside of the blind bore 48.

To promote the setting of the slurry as it moves through the die 22, the mandrel 46 is heated internally by heating fluid, preferably hot water, which is introduced into a hollow interior portion X of the mandrel 46 by a feed conduit 51 and is removed form the interior portion by a drain conduit 52. An adjustable stopper 53, is snugly positioned within the mandrel 46 for defining the length of the heated zone X in the inner mandrel, it being understood that the heated zone in the inner mandrel is the length of the mandrel above the stopper 53. An open space X' is defined below the stopper 53 extending into the blind bore 48.

The conduits 51 and 52 extend through openings defined in the stopper 53. The conduit 51 preferably extends well above the stopper 53 to introduce the heated water into the heated zone X, and the conduit 52 preferably extends just into the heated zone for removing water from the heated zone. The conduits 51 and 52 are preferably provided by TEFLON tubing to minimize radiation of heat through the conduits such that the heating effect of the hot water within the conduits is restricted to the heated zone X of the inner mandrel.

The conduit 51 is aligned and in flow communication with a delivery conduit 54, radially disposed in the flange 44, and the conduit 54 is in flow communication with a heated fluid delivery conduit 55 (see FIGS. 2 and 3) delivering heated fluid from a heating unit 56 of the temperature control system 24. The conduit 54 may be in the form of an opening extending radially through the flange 44, and conduits 55 and 51 may be sections of the same length of tubing, a portion of which is contained in conduit 54.

The conduit 52 is aligned and in flow communication with an exit conduit 57 coaxially aligned with the delivery conduit 54 in the flange 44 and in flow communication with a return conduit 58 which returns the fluid to the heating unit 56. As with the conduit 51, the conduits 52 and 58 may be sections of the same length of tubing a portion of which is contained in exit conduit 57 which is an opening extending radially through the flange 44. It will be appreciated from FIGS. 4a and 4b that conduits 54 and 57 in flange 44 are disposed so as to extend radially through the portion of the flange located between spaced kidney-shaped openings 50, which extend axially through the thickness of the flange.

The outer die assembly 40 includes a disc-shaped flange 60 which supports the assembly 40 upon the flange 44 of the inner die assembly 38 and is held in concentric alignment by index pins 61(a) located on flange 44 for insertion into index openings 61(b) on the flange 60 (as shown in FIG. 4b). An elongate die barrel 64 is concentrically disposed relative to an opening 62 through the flange 60 and is attached to the flange 60 along a circumferential weld Y. The internal diameter of the barrel 64 exceeds that of the diameter of the mandrel 46 so as to define an elongate annular-shaped die cavity 65 or flow area through which the slurry 21 is advanced and within which the slurry is heated as to cause the slurry to set and provide a ceramic tube of the desired cross-sectional configuration. The thickness of the wall of the barrel 64 is sufficient to withstand the pressure exerted upon it by the advancing slurry material without deformation, and the inner surface is preferably provided by a material having a low coefficient of friction with respect to the material as described above for the outside surface of the mandrel 46, inasmuch as both will be exposed to forces exerted by the moving material.

In a preferred embodiment, the transfer flange 44 and the lowermost portion of the die barrel 64 are equipped with cooling conduits for maintaining the slurry at a relatively low temperature to ensure that the slurry remains in an essentially liquid state until it is well into the die cavity 65. Cooling of the flange 44 is accomplished by a conduit 66 which meanders through its body in a crisscrossing fashion from an entrance port 67 to an exit port 68. Chilled fluid enters the port 67 through a chilled fluid delivery conduit 69 leading from cooling unit 70 and returns to unit 70 in a return conduit 71 connected to exit port 68.

Cooling of the lower portion of the die barrel 64 is accomplished using a cooling coil 72 in flow communication with the cooling unit 70 via a chilled fluid delivery conduit 73 and delivery conduit 74 which extends through the body of the flange 60 and connects with coil 72. Fluid is returned to the cooling unit 70 from the coil 72 via an exit conduit 75 disposed in the flange 60 in a manner similar to the conduit 74, but on the opposite side thereof, and connected to a return conduit 76 for return of fluid to the cooling unit 70.

Along with heat transferred to the slurry in the die cavity 65 from the mandrel 46, heat is transferred to the slurry from the die barrel 64 by a heating coil 80 which is wrapped around the portion of the barrel 64 extending between cooling coil 72 and the discharge end of the barrel. The coil 80 conducts heated fluid around the outside of the barrel from heating unit 56 via delivery and return conduits 82 and 84, respectively (See FIG. 2). Delivery conduit 82 is connected to coil 80 via feed conduit 86 and return conduit 84 is connected to the coil via outlet conduit 88. The feed and outlet conduits 86 and 88 extend radially through flange 60 from generally opposite sides toward the center, and thence upwardly adjacent the outside of the die barrel 64 to the coil in the manner of conduits 74 and 75, as described previously with respect to the coil 72.

The function of the protective enclosure 42 is to provide a low-oxygen content atmosphere around the die 22 in the case in which the presence of oxygen may interfere with the solidification or setting up of the slurry. Such a condition may arise, for example, in the use of a slurry which hardens by polymerization of a monomer component wherein the presence of oxygen undesirably affects the polymerization process.

In the illustrated embodiment, the enclosure 42 comprises an annular-shaped flange 90, a tubular sheath 92 and a cap 94. The flange 90 has a doughnut shape and an outside diameter and thickness corresponding substantially to that of the flanges 36, 44 and 60 which all preferably have the same perimeter and thickness dimensions. The sheath 92 is sealably connected in an upright fashion to the flange 90 by suitable means so to be disposed generally coaxially with the die barrel 64 when the flange 90 is placed upon flange 60 as shown in FIG. 2.

The length of the sheath 92 is sufficient to accommodate the desired length of the discharging article and may therefore vary according to the length dimensions of the article to be produced. The cap 94 sealably encloses the end of the sheath 92.

In order to maintain a low oxygen concentration in the enclosure 42, it is purged with nitrogen admitted via a conduit 95 from a nitrogen gas source 96, and is exhausted via a conduit 97 for exhausting gas to the atmosphere or for some other use as indicated at 98. Preferably the gas pressure within the enclosure 42 is slightly above atmospheric to inhibit infiltration of ambient air. In order to allow observation of the process, the sheath 92 is preferably made of a clear plastic material.

The flanges 36, 44, 60 and 90 facilitate assembly of the components of the die 22 and the vessel 28 of the slurry displacement system 23. The interface area between each flange 36, 44, 60 and 90 is preferably sealed by the use of mating circular grooves containing 0-rings (not shown). Each flange contains a plurality of through openings, and the openings of the respective flanges are placed in axial alignment when the components are in their correct positional relationship with one another so that they can be secured together for use. For example, flange 36 contains circumferentially spaced-apart openings 100, flange 44 contains circumferentially spaced-apart openings 102, flange 60 contains circumferentially-spaced apart openings 104 and flange 90 contains circumferentially spaced-apart openings 106. The sets of openings 100, 102, 104 and 106 of the respective flanges are preferably disposed in a pattern in each flange so as to be axially alignable with respect to one another only when the flanges are rotated to place the components in their desired positional relationship to perform the above-described functions. The flanges 36, 44, 60 and 90 may then be secured together as by elongate bolts 108 having their head ends adjacent the flange 90 with the openings in the flange 36 being in the form of threaded blind bores or through openings (not shown) and the threaded ends of the bolts 108 being threadably received therein to enable tightening of the flanges together and assembly of the apparatus.

As mentioned above, the hydraulic system 25 forces the slurry from the bag 26 through the openings 50 in the flange 44 into the die chamber 65 at a controlled rate so that the slurry is advanced through the die chamber under substantially plug flow conditions. The hydraulic system includes a hydraulic pump 110 and hydraulic lines 112 of a type commonly utilized in the art, and further includes valves 114 and gauges 116 of a type commonly found in process control systems to monitor and control flow rates and pressures.

The hydraulic system 25 supplies pressurized hydraulic fluid to the reservoir 30 of the displacement vessel 28. The hydraulic fluid within the reservoir uniformly presses against the exterior of the containment bag 26 and thereby forces the slurry 21 into the die cavity 65. A hydraulic cylinder 118 may be placed in-line between the hydraulic pump 110 and the displacement vessel 28 and calibrated as a flow indicator.

Because the hydraulic fluid contacts the exterior of the containment bag 26, the hydraulic fluid in the reservoir 29 is preferably maintained at a sufficiently low temperature; e.g., about 0° C., to maintain the slurry in a liquid state in the containment bag. To this end, cooling fluid enters a coil 120 located in the reservoir 29 via conduit 122 from the cooling unit 70 and is returned to the cooling unit 70 from the coil 120 through a conduit 124. Further to this end, hydraulic fluid entering the reservoir 30 is pre-chilled by routing the hydraulic lines 112 through oil chillers 126 and 128, and thence on to the reservoir 30 via the conduit 129. The chillers 126 and 128 are cooled by fluid entering from cooling unit 70 via conduits 130 and 132 and cooling fluid is returned to unit 70 via conduits 134 and 136.

As mentioned earlier, the temperature control system 24 includes the cooling unit 70 and the heating unit 56 and their associated conduits, etc. The cooling unit 70 is preferably a refrigeration unit of conventional design, and chills a mixture of water and ethylene glycol or other suitable fluid cooling medium circulated therethrough by a pump (not shown) to a temperature sufficiently low to achieve the desired cooling. The heating unit 56 is also of conventional design, such as an electric or gas water heater, and heats water or other suitable fluid heating medium circulated therethrough by a pump (not shown) to a sufficiently high temperature to achieve the desired heating. Although heating functions in the illustrated embodiment are performed by circulating a heating fluid, other means of supplying the necessary heat energy may be employed such as electrically powered heating elements.

EXAMPLE 1

Continuous Cast Alumina Tubing

An aqueous suspension was prepared by mixing an alumina powder available under the trade designation RCLS-DBM from Reynolds Chemical Co., of Bauxite Ark. with deionized high purity water, polymerizable monomers, a dispersant, and a sintering aid. Both a monofunctional monomer, acrylamide (AM), and a difunctional monomer, N,N'-methylene-bisacrylamide (MBAM) were used in this example. The dispersant was a 40% aqueous solution of ammonium polyacrylate available under the trade designation Darvan 821A from R. T. Vanderbilt Co., Greenwich, Conn. Magnesium oxide powder (0.05 wt % of the total solids weight) was added to the slurry as a sintering aid. A 1000 ml batch of slurry (55 volume % solids) was prepared as follows:

| a. | 550 ml solids | $Al_2O_3$: | @3.97 g/ml = 2183.50 g |
|---|---|---|---|
| | | MgO: | 0.05 wt % = 1.09 g |
| b. | 450 ml liquids | Premix "C" | 426.31 ml |
| | | Darvan 821A | 23.69 ml |
| c. | Premix "C" | 7 parts aqueous solution containing 20 wt % AM | |
| | | 3 parts aqueous solution containing 2 wt % MBAM | |

The preferred order of addition is as follows. The Premix "C" solution was prepared and the dispersant added, followed by the alumina powder. A small amount of the liquid was retained for combination with the MgO powder. The MgO was mixed with this solution (1 ml dispersant: 4 ml of the premix solution) and added to the slurry while stirring.

The slurry was mixed at about 800 rpm using a Caframo RZR-2000 lab stirrer, followed by continuous mixing on a laboratory shaker for about 8 hours. After mixing, the slurry was degassed on a laboratory Roto-evaporator at 0° for approximately 1 hour.

The initiator was a 5 wt % aqueous solution of ammonium persulfate $(NH_4)_2S_2O_8$. Prior to the beginning of a run, a series of initiator-response tests were conducted to quantify the working time at various additions of the initiator. Because there is an occasional variation in the reactivity of the initiator and monomers due to age and concentration, pre-trials were used to determine the precise initiator ratios. For the run described in this example, a ratio of 20 ml slurry: 15 μl of 5 wt % aqueous solution of initiator was determined to give the optimum degree of response for samples thermally polymerized at 70° C. After the pre-chilled initiator solution was added, the slurry was mixed for an additional 5 minutes in the roto-evaporator before transfer to the apparatus. The viscosity of the solution at approximately 1° C. was approximately 2 to 6 poise.

During casting, the slurry was flowed into an elongate annular-shaped die cavity having a 1.0 inch outside diameter x 0.5 inch inside diameter die at a manually controlled rate to produce an output rate of about 1.5 linear inches per minute. The die cavity was 24 inches in total length, the first 10 inches being cooled to maintain the slurry at a temperature of about 0° C. as the flow stabilizes, and the temperature is gradually increased over the remaining 14 inches to about 70° C. to initiate the polymerization reactions and solidification of the matrix in a tubular shape as it emerges from the end of the cavity. Alumina tubes up to 36 inches in length were cast. After drying and sintering for 1 hour at 1600° C., the densities of the tubes were typically greater than 97% of theoretical. The four-point bend flexure strength at room temperature of eleven test bars machined from one tube was found to be 230±58 MPa (33.4±8 ksi) which is within the normal range of strengths for alumina ceramics.

EXAMPLE 2

Continuous Cast Cordierite Tubing

An aqueous suspension of a glass frit having the composition of the ceramic cordierite ($2MgO-2Al_2O_3-5SiO_2$) was prepared in deionized high purity water along with polymerizable monomers, dispersants, and sintering aids. Preparation of the slurry was essentially the same as in Example 1 with the following exceptions. The powder was a glass frit sold under the trade designation SG-266M by Ferro Corporation of Cleveland, Ohio. The frit was used as received. The dispersant a 25% aqueous solution of ammonium polymethacrylate available under the trade designation DARVAN "C" by R. T. Vanderbilt Co. of Greenwich, Conn. A 1000 ml batch of slurry (57 volume % solids) was prepared as follows:

| a. | 570 ml solid | SG-266M frit: @2.6 g/ml = 1482.75 g | |
|---|---|---|---|
| b. | 430 ml liquids (of the following composition) 9:0.5 Premix "C" to dispersant (Darvan "C") respectively: | | |
| | | Premix "C" | 407.05 ml |
| | | Darvan "C" | 22.92 ml |
| c. | Premix "C" | 7 parts aqueous solution containing 20 wt % AM | |
| | | 3 parts aqueous solution containing 2 wt % MBAM | |

The components of the slurry were combined in the order of Example 1, and the slurry was mixed and degassed in the same manner as that example. The initiator was a 5 wt % aqueous solution of ammonium persulfate $(NH_4)_2S_2O_8$, as in Example 1. However, in this example the initiator response tests indicated that a ratio of 20 ml slurry to 20 μl of the initiator solution gave the optimum response when samples were polymerized at 70° C. The slurry was used to continuously cast tubes in the same manner as described in Example 1.

After drying, the cast tubular green body was cut into six-inch lengths and further machined to produce two opposing axial rows of small-diameter holes, each row below an overhanging ledge. The machined bodies were subsequently sintered to coalesce the glass particles and then further heat treated, using a thermal cycle recommended by the frit manufacturer, to crystallize the glass particles into the ceramic cordierite The ceramic tubes were fitted to a propane gas/air supply system. A series of tests in which the gas mixture was repeatedly ignited and extinguished without damaging the ceramic burner, demonstrated the success of the invented method and apparatus for continuously fabricating this material and form.

The present invention provides ceramic articles having improved properties. The continuous casting technique enables better control over the quality and uniformity of the articles, and is believed to improve the homogeneity of the individual articles. Ceramic articles made in accordance with the present invention are of near net final shape and are essentially self-supporting in that they are substantially rigid and are not easily warped or distorted. Thus, it will be appreciated that the present invention improves over current injection molding methods because dies of relatively short dimensions may be utilized to produce complex articles of great length in place of long, complex molds. Also, the invention is believed to require relatively low pressures for advancing the slurry through the die (100 psi or lower) and the process requires relatively mild temperatures (0° C. to 70° C.) so that high energy consumption is avoided. The process requires minimal labor as compared with other ceramic forming techniques and the equipment is relatively uncomplicated and easy to use. It is also contemplated that the method and apparatus of the present invention may be used to produce many complex shapes such as those shown in FIGS. 5b–5e, simply by altering the cross-sectional configuration of the flow area through the use of different-shaped dies.

The foregoing description of certain embodiments of the present invention has been provided for purposes of illustration only, and it is understood that numerous modifications or alterations may be made without departing from the spirit and scope of the invention as defined in the following claims.

What is claimed is:

1. A method for use in the production of articles made of a particle-based material which comprises providing a thermally settable slurry containing a relatively high concentration of the particles and a polymerizable and cross-linkable monomer dispersed therein, applying a pressure to the slurry to convey the slurry through an elongate flow area having a desired cross-sectional configuration and directing the flow so as to minimize mixing and shear conditions as the slurry passes through the flow area, controlling the temperature of the slurry being conveyed through the flow area so that the temperature of the slurry is sufficient to initiate polymerization and cross-linking of the monomer as said slurry is conveyed through said flow area, coordinating control of the temperature of said slurry with the conveying of the slurry through the flow area so that said slurry is conveyed through the flow area at a rate which maintains the slurry within the flow area for a time sufficient to enable the monomer in the slurry to polymerize and cross-link sufficiently to cause the advancing slurry to set into a relatively hard mass having a cross-sectional configuration conforming to that of the flow area just prior to exiting the flow area so that slurry introduced into the flow area and conducted through the flow area is delivered from the flow area in a substantially continuous and self-supporting, elongate solid form, and discharging the hardened mass from the flow area as a substantially self-supporting elongate solid having substantially the cross-sectioned configuration of the flow area.

2. The method of claim 1, further comprising heating the discharged solid to substantially drive off nonparticle components of the slurry and sintering the solid to cause consolidation of particles contained therein.

3. The method of claim 1, wherein the heating and sintering occur in a single step.

4. The method of claim 1, wherein said slurry comprises powder and a dispersant for said powder in an aqueous solution containing monomers wherein the monomers polymerize to form an essentially solid polymeric matrix supporting the particles therein as a dispersed phase.

5. The method of claim 1, wherein said step of controlling the temperature of the slurry comprises warming the slurry as it advances through the flow area.

6. The method of claim 1, wherein the thermally settable slurry sets at a predetermined temperature and the temperature of the slurry is controlled to cause the slurry to set by gradually adjusting the temperature of the slurry to the predetermined temperature as it advances through the flow area.

7. The method of claim 1, wherein the flow area has an annular cross-sectional configuration whereby the discharging solid has an annular cross-sectional configuration conforming substantially to that of the flow area.

8. The method of claim 1, wherein the slurry is conveyed through the flow area under substantially plug flow conditions.

9. The method of claim 1, wherein the particles are ceramic.

10. An apparatus for the production of articles having a desired cross-sectional configuration and made of a particle-based material which comprises:

means for supplying in liquid form a thermally settable slurry having a relatively high concentration of the particles and a polymerizable and cross-linkable monomer dispersed therein;

means for defining an elongate flow area having a cross-sectional configuration substantially corresponding to the desired cross-sectional configuration, the flow area having an entrance end for admitting material therein in liquid form and an exit end for discharge of material therefrom in solid form;

means for conveying said slurry in a substantially liquid form into said entrance end of said flow area so that said slurry is flowably admitted into said flow area and conveyed through said flow area toward said exit end, wherein said means for conveying causes a pressure to be applied to said slurry to urge the slurry into and through the flow area and to minimize mixing and shear conditions as the slurry passes through the flow area; and means for controlling the temperature of said slurry so that the temperature of the slurry is sufficient to initiate polymerization and cross-linking of the monomer as said slurry is conveyed through said flow area toward said exit end, means for coordinating said means for controlling the temperature and said means for conveying said slurry so that said slurry travels through the flow area at a rate which maintains the slurry within the flow area for a time sufficient to enable the monomer in the slurry to polymerize and cross-link sufficiently so that the advancing slurry sets during its travel through the flow area into a relatively hard mass, said relatively hard mass having a cross-sectional configuration in accordance with that of the flow area so that the hardened mass discharges from the exit end of the flow area as a substantially self-supporting elongate solid having substantially the cross-sectional configuration of the flow area.

11. The apparatus of claim 10, wherein said die comprises opposed shaped surfaces defining said flow area therebetween so that said slurry is in contact with said surfaces, and said means for controlling the temperature of said slurry comprises means for heating said opposed surfaces to cause heat transfer between said slurry and said surfaces.

12. The apparatus of claim 11, wherein said opposed surfaces are provided by a material having a relatively low coefficient of friction with respect to the adjacent moving slurry and resulting hardened mass so that shear forces in the material adjacent the surfaces are minimized.

13. The apparatus of claim 10, wherein said means for controlling the temperature of the slurry includes means for maintaining the temperature of the slurry in advance of admittance to the die sufficiently low to avoid hardening of the slurry and means for increasing the temperature of the slurry after it flows into said flow area to a temperature sufficiently high to cause the slurry to set up into a relatively hard mass in the flow area.

14. The apparatus of claim 10, wherein said means for conveying comprises means for applying pressure to the slurry to urge the slurry into and through the die under steady state substantially plug flow conditions and to cause the hardened material to be continuously discharged from the exit end of the die.

15. A method for producing an essentially self-supporting solid article from a thermally settable slurry having at least one cross-linkable monomer, a plurality of powder particles, and a dispersant for dispersing the particles within the slurry, the method comprising the steps of:

passing the slurry through an elongate die under conditions which minimize mixing and shear conditions as the slurry passes through the die;

controlling the temperature of the slurry as it passes through the die such that the monomer cross-links to form a matrix while the slurry is moving through the die such that the slurry is transformed into an essentially solid cross-sectional shape by the time it exits the die;

coordinating control of the temperature of said slurry with the passage of the slurry through the die so that said slurry is conveyed through the die at a rate which maintains the slurry within the die for a time sufficient to enable the monomer in the slurry to polymerize and cross-link so that the slurry sets during its travel through the die into a hardened mass; and discharging the hardened mass from the die as a substantially self-supporting elongate solid having substantially the cross-sectioned configuration of the die.

16. The method of claim 15, wherein said powder particles are ceramic.

* * * * *